United States Patent

Satoh et al.

[11] Patent Number: 5,930,001
[45] Date of Patent: *Jul. 27, 1999

[54] COPIER WHICH ROTATES AN IMAGE BASED ON THE RECOGNITION OF AN EXTRACTED CHARACTER FROM VARIOUS DIRECTIONS

[75] Inventors: Akihiko Satoh, Kawasaki; Yoshihiro Hosomi; Hirokazu Takahashi, both of Yokohama; Yoshio Mizuno, Ichikawa; Tokuharu Kaneko, Yokohama; Satoshi Kaneko, Kawasaki; Taisei Fukada, Nagaokakyo; Keizo Isemura, Koganei; Hirohiko Kishimoto, Kawasaki; Masayoshi Taira, Yokohama; Masahiro Serizawa, Yokohama; Noriaki Matsui, Yokohama, all of Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/547,271

[22] Filed: Oct. 24, 1995

[30] Foreign Application Priority Data

Oct. 25, 1994 [JP] Japan .................................. 6-260050

[51] Int. Cl.⁶ .............................. H04N 1/40; G06K 9/72
[52] U.S. Cl. .......................... 358/296; 358/444; 382/296; 399/410
[58] Field of Search ..................................... 358/296, 401, 358/444, 448, 452; 382/296, 297; 399/83, 381, 407, 408, 410

[56] References Cited

U.S. PATENT DOCUMENTS

| 4,763,167 | 8/1988 | Watanabe et al. | 399/410 X |
| 4,905,054 | 2/1990 | Rood | 399/408 X |
| 5,077,811 | 12/1991 | Onda | 382/46 |
| 5,343,304 | 8/1994 | Nakai et al. | 358/296 |

FOREIGN PATENT DOCUMENTS

| 60-153666 | 8/1985 | Japan | H04N 1/00 |
| 2264560 | 9/1990 | United Kingdom | G03G 15/00 |

*Primary Examiner*—Shawn Riley
*Assistant Examiner*—Gregory J. Toatley, Jr.
*Attorney, Agent, or Firm*—Fitzpatrick, Cella, Harper & Scinto

[57] ABSTRACT

An image processor rotates an image in conformity with the orientation of an original, thereby enhancing user convenience. An original conveyed by an automatic conveyance device is read by an image reader and the image is stored in an image memory. A character in the stored image is subsequently recognized by a character recognition unit and the orientation of the character is discriminated. The image is rotated by an image editor in conformity with a stapling position, and the rotated image is recorded by an image recording unit. Sheets of paper on which images are recorded are stapled at the stapling position by a staple provided in a sorter.

20 Claims, 12 Drawing Sheets

FIG. 6
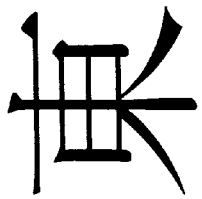 SAMPLED CHARACTER — NOT RECOGNIZABLE S406, 407
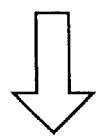 (ROTATE CHARACTER BY 90°) S408
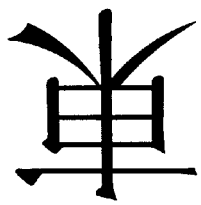 NOT RECOGNIZABLE S406, 407
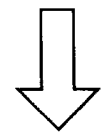 (ROTATE CHARACTER BY 90°) S408
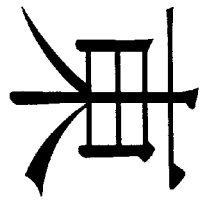 NOT RECOGNIZABLE S406, 407
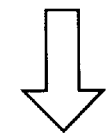 (ROTATE CHARACTER BY 90°) S408
 RECOGNIZABLE S406, 407

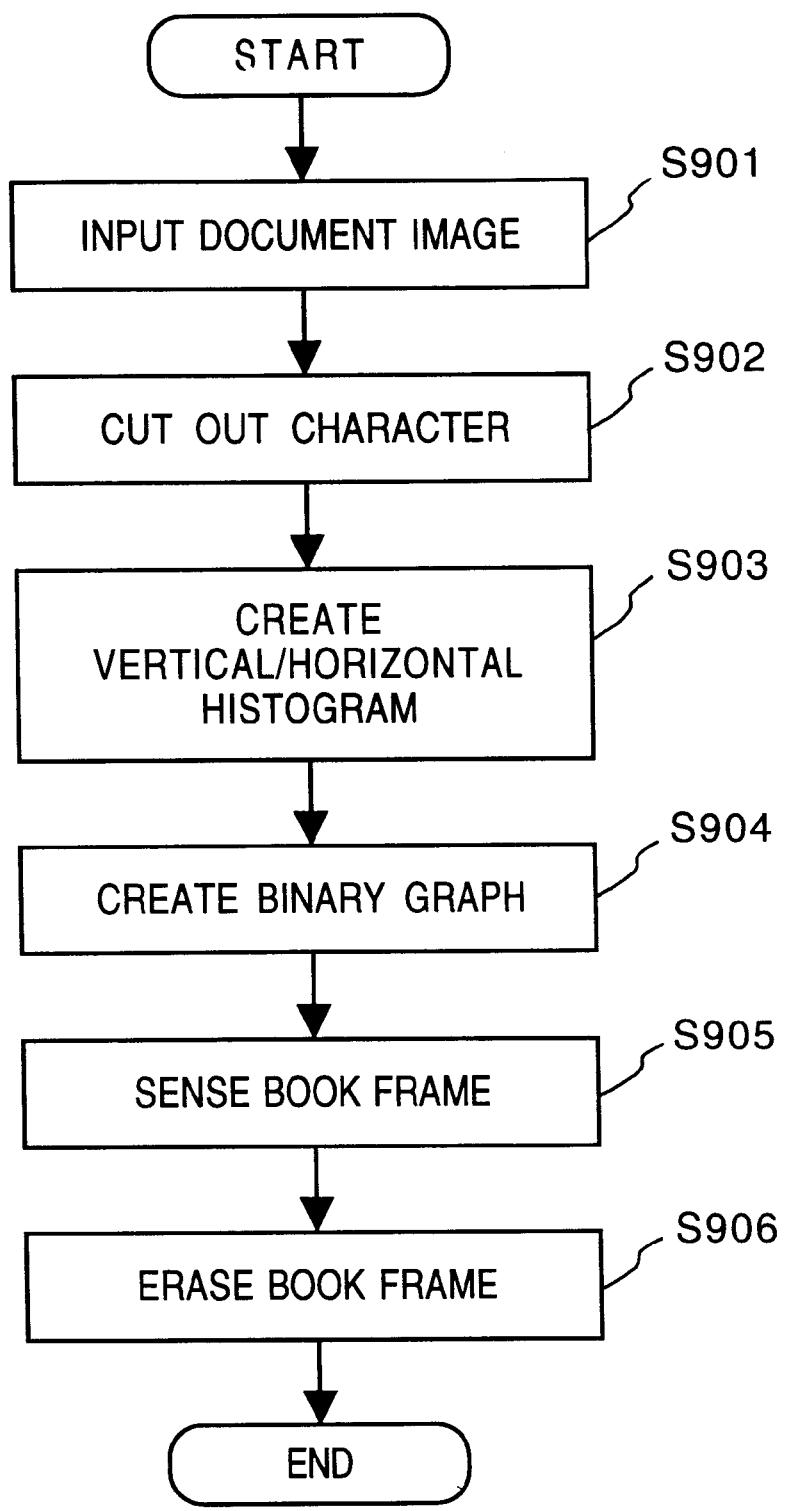

COPIER WHICH ROTATES AN IMAGE BASED ON THE RECOGNITION OF AN EXTRACTED CHARACTER FROM VARIOUS DIRECTIONS

BACKGROUND OF THE INVENTION

Field of the Invention

This invention relates to a copier apparatus in which the image of a read original is capable of being printed upon being subjected to rotation processing.

A stapling sorter capable of stapling sheets on which copies have been made by a copier is known in the art. The stapling sorter automatically staples an upper corner of the copies produced by the copier. However, the stapler with which the stapling sorter is equipped is provided at a fixed location. This means that if the set original is not correctly oriented, a lower corner rather than the upper corner of the copies is stapled, thus making it difficult to turn the pages. Accordingly, if the conventional apparatus is used, the operator must take the trouble to see that the original is correctly oriented.

SUMMARY OF THE INVENTION

Accordingly, an object of the present invention is to provide a copier apparatus which solves the aforementioned problem.

Another object of the present invention is to provide a copier apparatus in which the proper location on a sheet is stapled at all times regardless of the orientation of the image of the set original.

According to the present invention, the foregoing object is attained by providing a copier apparatus including reading means for reading an image from an original, discriminating the means for discriminating orientation of the image read by the reading means, processing means for subjecting the image read by the reading means to rotation processing in conformity with the results of discrimination performed by the discriminating means, and recording on a sheet means for recording an image, which is obtained from the processing means.

Other features and advantages of the present invention are apparent from the following description taken in conjunction with the accompanying drawings, in which like reference characters designate the same or similar parts throughout the figures thereof.

BRIEF DESCRIPTION OF THE DRAWINGS

FIG. 6 is a diagram for describing the manner in which the orientation of a character sample is determined;

FIG. 12 is a flowchart of control for removing a shadow from a copy when a book is exposed for copying.

DESCRIPTION OF THE PREFERRED EMBODIMENTS

Preferred embodiments of the present invention described in detail below with reference to the drawings.

(First Embodiment)

Figure 1:
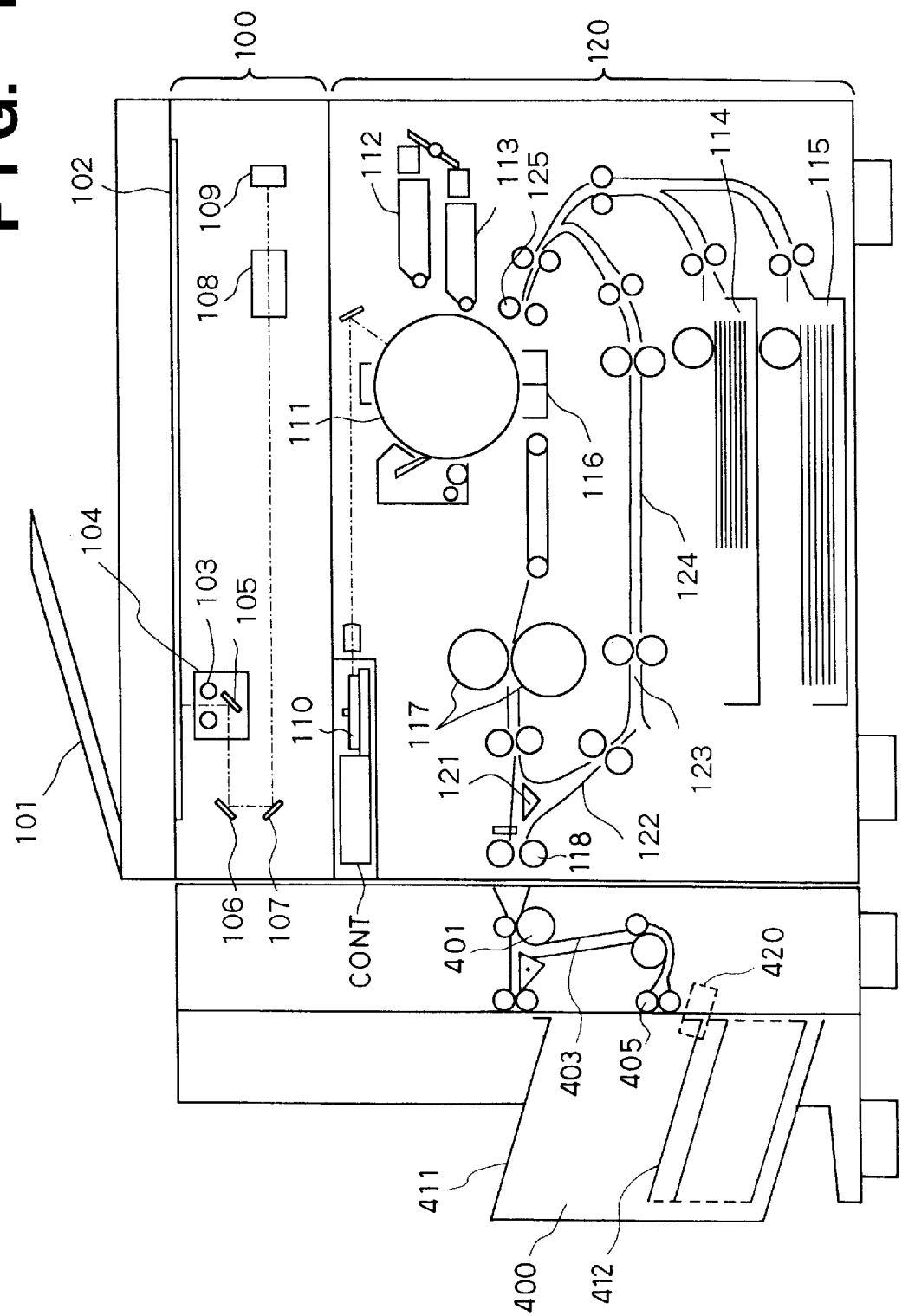
FIG. 1 is a sectional view showing the structure of a copier apparatus according to an embodiment of the present invention.

FIG. 1 is a sectional view showing the structure of a copier apparatus according to an embodiment of the invention. A device 101 for automatically supplying originals feeds placed originals to a predetermined position on a glass platen 102 one at a time two sheets in succession. A scanner 104, which comprises lamps 103 and a scanning mirror 105, is reciprocated in a prescribed direction with respect to the original fed to the surface of the glass platen 102 by the supply device 101. Light reflected from the original is reflected by scanning mirrors 105~107 and then passed upon by a lens 108 so that an image of the original is formed on a image sensor 109. The sensor 109 reads the image of the original. An exposure control unit 110 modulates the light beam based upon image data subjected to image processing by a controller CONT and irradiates a photosensitive drum 111 with the modulated light beam. The electrostatic latent image formed on the photosensitive drum 111 is rendered visible by developing devices 112, 113 using developing agents (toners) of prescribed colors.

Sheet stackers 114, 115 stack and accommodate sheets of a fixed size. The sheets are fed to the position of resistance rollers by driving paper feeding rollers and are fed again at a timing at which the leading edge of the image coincides with the leading edge of the image formed on the photosensitive drum 111. A corona discharge device 116 for transfer and separation transfers the toner image, which has been developed on the photosensitive drum 111, to the sheet and then separates the sheet from the photosensitive drum 111. A fixing unit 117 fixes the toner image on the sheet, which has been sent to it via a conveyor belt. An ejection roller 118 ejects the sheet, on which the image is formed, toward a sorter 400. A directional flapper 121 changes over the conveyance direction of this sheet to a direction along which the sheet is conveyed into the sorter 400. This is to prepare for multiple/double-sided image formation. The sorter 400 has a plurality (20, for example) of bins 412 and a non-sorting tray 411.

Figure 3:
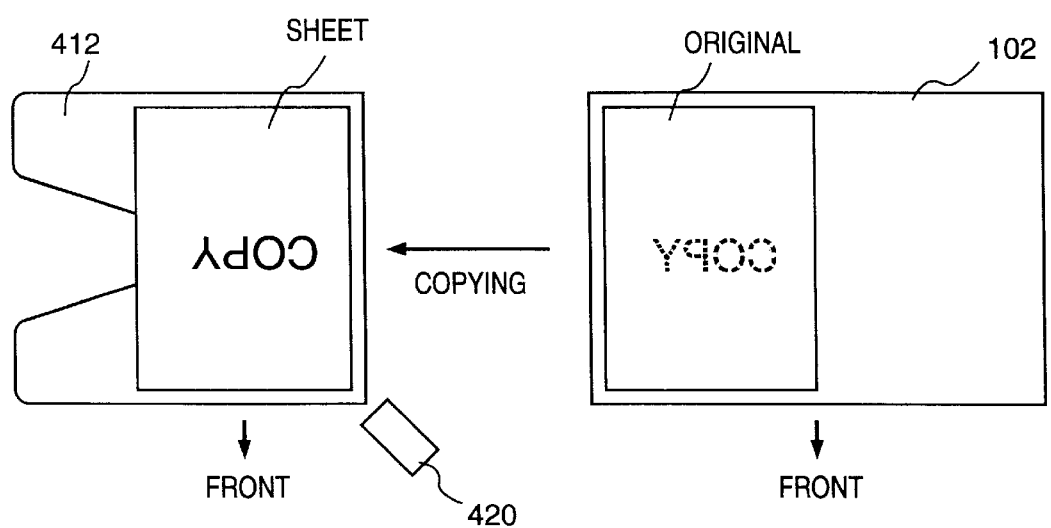
FIG. 3 is a diagram showing the relationship between the orientation of a set original and the position at which a copy is stapled.

In the sorting mode, sheets to which images have been transferred are successively ejected from the ejection roller 118 reach a conveyance roller 401 of the sorter 400. Whenever a sheet is ejected toward each bin 412 from ejection rollers 405 via a conveyance path 403, each bin 412 is moved up and down by a bin shifting motor (not shown), whereby sorting is performed. If a stapling mode is selected, the sheets in each bin are stapled by a stapler 420 while the bins 412 are moved one at a time by the bin shifting motor when the overall copying operation has ended. The stapler 420 is provided on the front side of the apparatus in FIG. 1. When an original is placed upon the glass platen 102 and copied, as shown in FIG. 3, a sheet on which the copy has been produced is ejected into the bin 412, where its upper left-hand corner is stapled.

Figure 2:
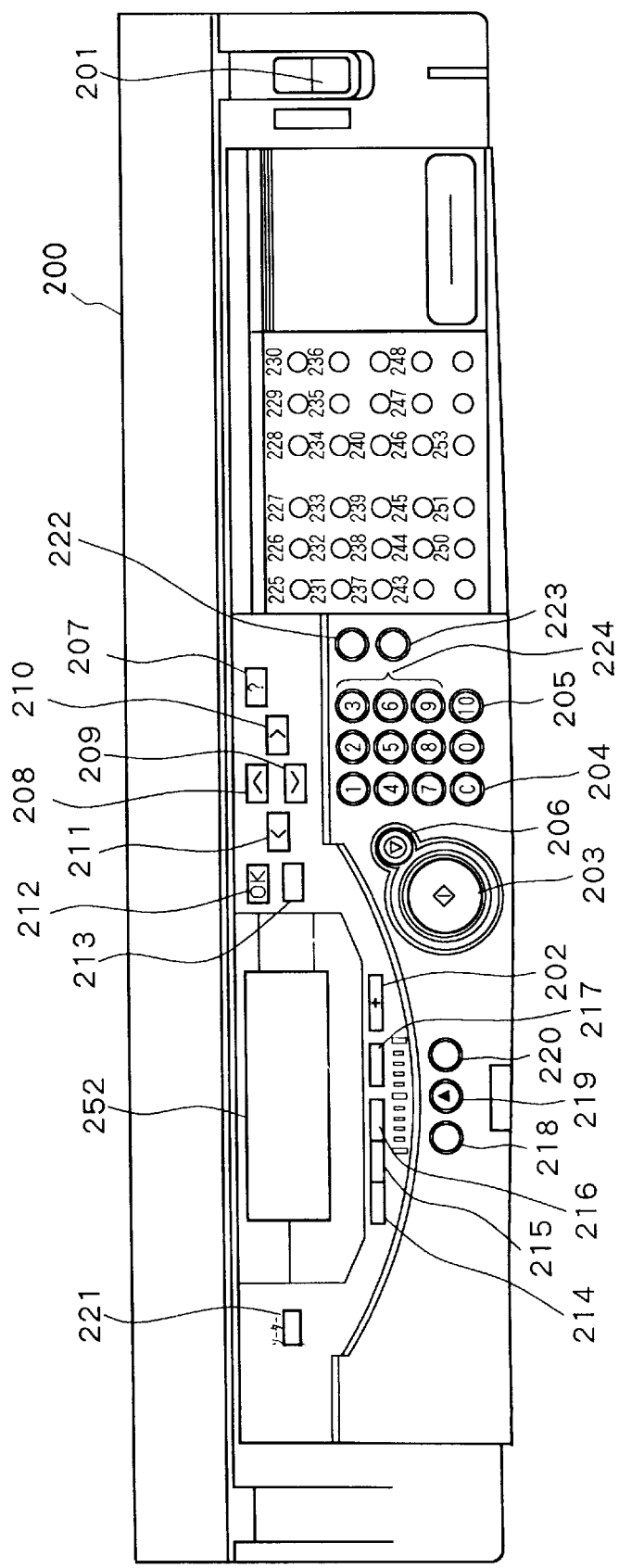
FIG. 2 is a diagram showing the control panel of the copier apparatus.

FIG. 2 is a diagram showing the control panel of the copier. The control panel has a power switch 201 for controlling the supply of power to the apparatus, a reset key 202 which operates as a key for restoring the standard mode during standby, a copy start key 203, a clear key 204 used to clear numerical values, and an ID key 205 by which a specific operator is allowed to perform a copying operation while other operators are prohibited from such an operation unless they enter a proper ID using this key. A stop key 206 is used to interrupt or stop copying. A help key 207 is used to ascertain the various functions of the apparatus. An up-cursor key 208 and a down-cursor key 209 move a cursor up and down, respectively, on each function setting screen. A right-cursor 210 and a left-cursor 211 move a cursor rightward and leftward, respectively, on each function setting screen. An OK key 212 is pressed when the settings on each function setting screen are acceptable. An execute key 213 is pressed when a function outputted at the lower right of the display, described later, is executed.

A standard reduction key 214 is used to reduce one standard size to another standard size. A 1:1 key 215 is used to select a copy of the same magnification as the original. A standard enlargement key 216 is used to enlarge one standard size to another standard size. A cassette selection key 217 selects a cassette stage for copies. A copy-density adjusting key 218 is for reducing density. An AE key 219 automatically adjusts copy density in conformity with the density of the original. A copy-density adjusting key 220 is for increasing density. A key 221 is for designating the operation of the sorter and makes it possible to designate a sorting mode or a stapling sorting mode. A preheating key 222 is used to turn a preheating mode on and off. An interrupt key 223 is used when it is desired to make a copy by interrupting a copying operation in progress. A numeric key pad 224 is used when it is desired to enter a numerical value.

A marker processing key 225 is used for setting trimming and masking (contour processing, net processing, shadowing processing, negative/positive processing). A pattern key 226 is used to express a color as a pattern or to express a color by a density difference. A color processing key 227 is used when it is desired to erase a specific color. A picture-quality key 228 it used to set picture quality. A negative/positive key 229 is used to execute negative/positive processing. An image creation key 230 is used to perform contour processing, shadowing processing, screen processing, slant processing, mirror processing and repeat processing. A trimming key 231 is used to designate an area and perform trimming. A masking key 232 is used to designate an area and perform masking. A partial processing key 233 is for designating an area and subsequently designating partial processing (contour processing, screen processing, shadowing processing and negative/positive processing). A frame erasing key 234 is used to erase a frame in conformity with the mode. The modes include sheet frame erasure (a frame is for a sheet size), original frame erasure (a frame is in conformity with the size of the original, with the original size being designated), and book frame erasure (a frame and a central blank space are in conformity with the spread size of a book, with the book-spread size being designated).

A binding margin key 235 is used when it is desired to create a binding margin on one edge of a sheet of paper. A move key 236 is used to perform movement. Movement includes translation (up, down, left, right), center movement, corner movement and designated movement (point designation). A zoom key 237 is used for setting copying magnification from 25% to 400% at increments of 1%. Magnification can be set independently in the main-scan direction and sub-scan direction. An auto-zoom key 238 is used to perform enlargement and reduction automatically in conformity with the size of the copy paper. Auto-zooming can be performed independently in the main-scan direction and sub-scan direction. A continuous-enlargement key 239 is used to make a plurality of enlarged copies of a single original. A reduction layout key 240 is used to enlarge/reduce a plurality of originals to a single copy.

A two-page separation key 243 divides the copying area of the glass platen into left and right halves to make two separate copies (two-page separation copies, two-sided originals to one-sided copies). A double-side key 244 is used when it is desired to output both sides (one sided originals to two-sided copies, two-page separation two-sided copies, two-sided originals to two-sided copies). An overlay key 245 is used when it is desired to perform overlaying (overlay copy, two-page separation overlay copy). A memory key 246 is used when it is desired to implement a mode which uses a memory (memory synthesis, area synthesis, watermark synthesis). A projector key 247 is employed when a projector is used. A printer key 248 is used to set printing time. An original mixing key 250 is used to mix original sizes when copies are made using a feeder. A mode memory key 251 is used to register a set copy mode or to call a registered copy mode. Numeral 252 denotes a display surface for displaying the status of the apparatus, the number of copies, the copy magnification and the copy paper size. During the setting of the copy mode, the screen 252 displays the set mode.

Figure 4:
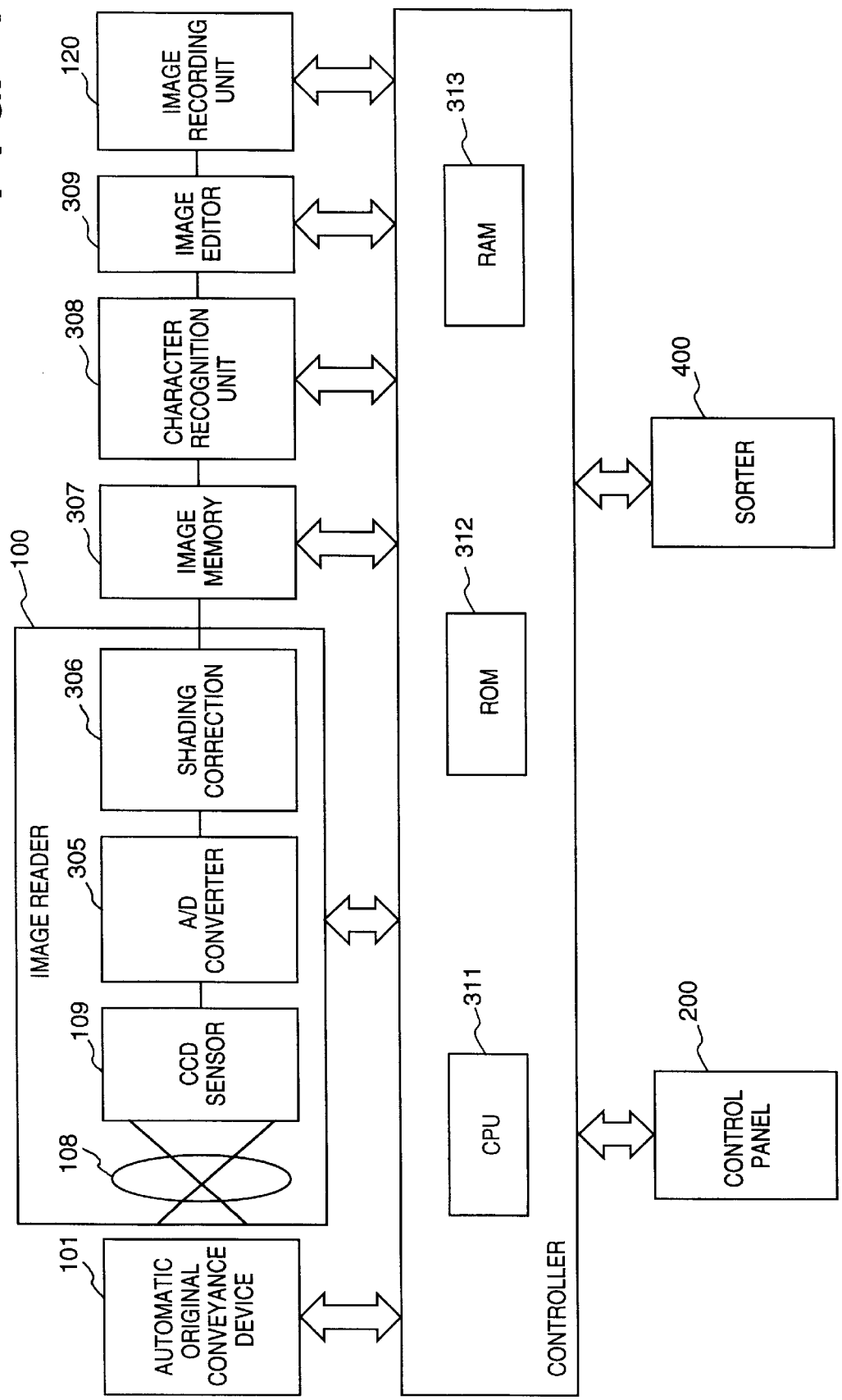
FIG. 4 is a block diagram illustrating a copier apparatus.

FIG. 4 is a block diagram showing the construction of the copier apparatus.

First, originals are automatically supplied to the platen by the automatic supply device 101. After an original is illuminated by the lamps, the light reflected from the original is condensed by the lens 108 and the image of the original is formed by the CCD sensor 109. The output of the sensor is converted from an analog signal to a digital signal by an A/D converter circuit 305, the digital signal is subjected to a shading correction by a shading correction circuit 306, and the result is stored in an image memory 307 as image data indicative of the original.

Next, the characters on the original are recognized by a character recognition unit 308 based upon the original image data stored in the image memory 307. The recognition method is described later in further detail in accordance with the flowchart shown in FIG. 5. A CPU 311 discriminates the orientation of characters on the original in dependence upon the results of character recognition performed by the character recognition unit 308 and, on the basis of the results of discrimination, judges whether to output the read image without subjecting it to rotation processing or to apply the rotation processing before output and issues the relevant instruction to an image editor 309. The latter edits the image in accordance with the image processing instruction from the CPU 311. An image recording unit 120 outputs the image received from the image editor 309.

The processing procedure executed by the CPU 311 and control data area stored in a ROM 312. A RAM 313 is a memory in which various tables are defined as well as a working area, which is used when the processing procedure of the CPU 311 is executed.

Figure 5:
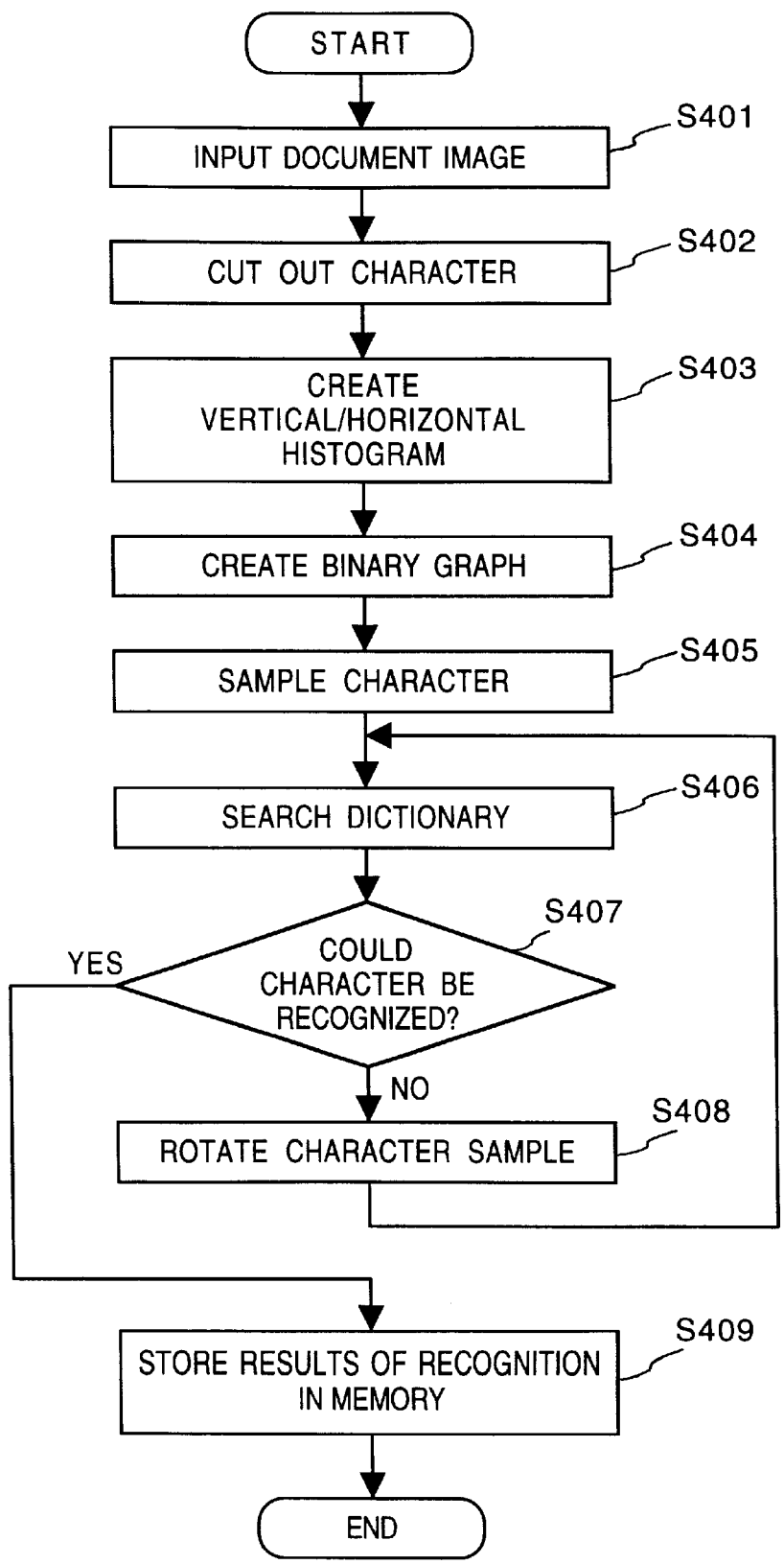
FIG. 5 is a flowchart of character recognition.

The method used by the character recognition unit 308 to recognize the characters on the original is described below in accordance with the flowchart shown in FIG. 5.

Figure 7:
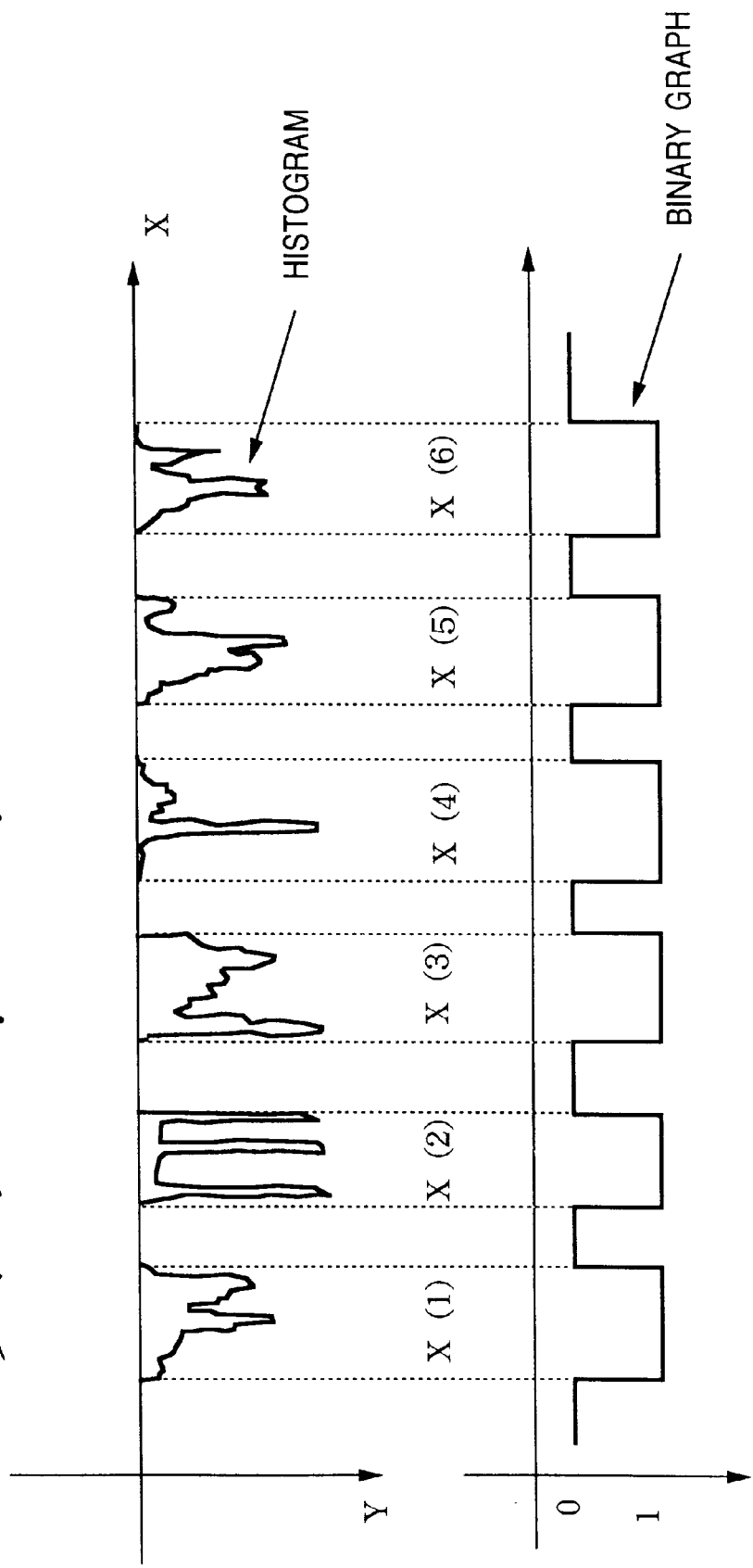
FIG. 7 is a diagram for describing a method of extracting a character sample.

First, at step S401, a document image indicative of the original is entered from the image memory 307, character portions are cut from the image at step S402, and histograms in the vertical and horizontal directions are created with regard to each character, as shown in FIG. 7, at step S403. Next, it is necessary to extract an easily recognizable character in order to discriminate the character orientation. To extract the character sample, the results of the above-mentioned histograms are used and a character having a large width in each of the vertical and horizontal direction is selected and adopted as a sample.

More specifically, a dot portion in the histogram is made "1" and a portion which is not a dot is made "0", whereby a binary graph is created at step S404. At this time the width of the "1" level corresponds to the width of the character. (Since there are exceptions, the character for which the widths of the "1" level are large in the vertical and horizontal directions is selected.) Accordingly, at step S405, one character having a large width for the "1" level in both the vertical and horizontal directions is selected and sampled.

Next, when the sampled character has been determined, a dictionary is searched for the character at step S406 by referring to dictionary codes that have been stored in the ROM 312, and the character is subjected to recognition. Thereafter, it is determined at step S407 whether the character has been recognized. If the character has been recognized, the program proceeds to step S409, where the data indicative of the orientation of this character is stored in RAM 313 as the result of recognition. If the character has not been recognized, the program proceeds to step S408, at which the sampled character is rotated by 90°, as shown in FIG. 6, after which the dictionary is searched again at step S406. If it is not possible to recognize the character again, the character is rotated a further 90° (for a total of 90°+90°=180° of rotation). Searching of the dictionary is repeated up to a maximum of three rotations (for a total rotation of 270°) (steps S406~S408). At the moment recognition processing ends, the data representing the orientation of the character is stored in the RAM 313 (step S409).

FIG. 7 is a diagram for describing the method of extracting a character sample. Projections of a character string are taken in the vertical and horizontal directions to create histograms. Next, based upon the results of the histograms, a value in the case of a dot portion is made "1" and a value in the case of a portion which is not a dot is made "0", whereby a binary graph is created. A width X(i) which takes on the value "1" in the horizontal direction and a width Y(i) which takes on the value "1" in the vertical direction are obtained.

In the example shown in FIG. 7, a binary graph is created from the histograms with regard to the horizontal direction, and character widths X(i) [X(1)~X(6)] in the horizontal direction are obtained. Furthermore, a binarized graph in the vertical direction is created and character widths [Y(1)~Y(6)] in the vertical direction are also obtained. When a character sample is selected, character-width data [width in the horizontal direction+width in the vertical direction=X(i)+Y(i)=z(i)] is obtained with regard to each character and a character for which the value Z(i) is large is extracted as the character sample.

Figure 8:
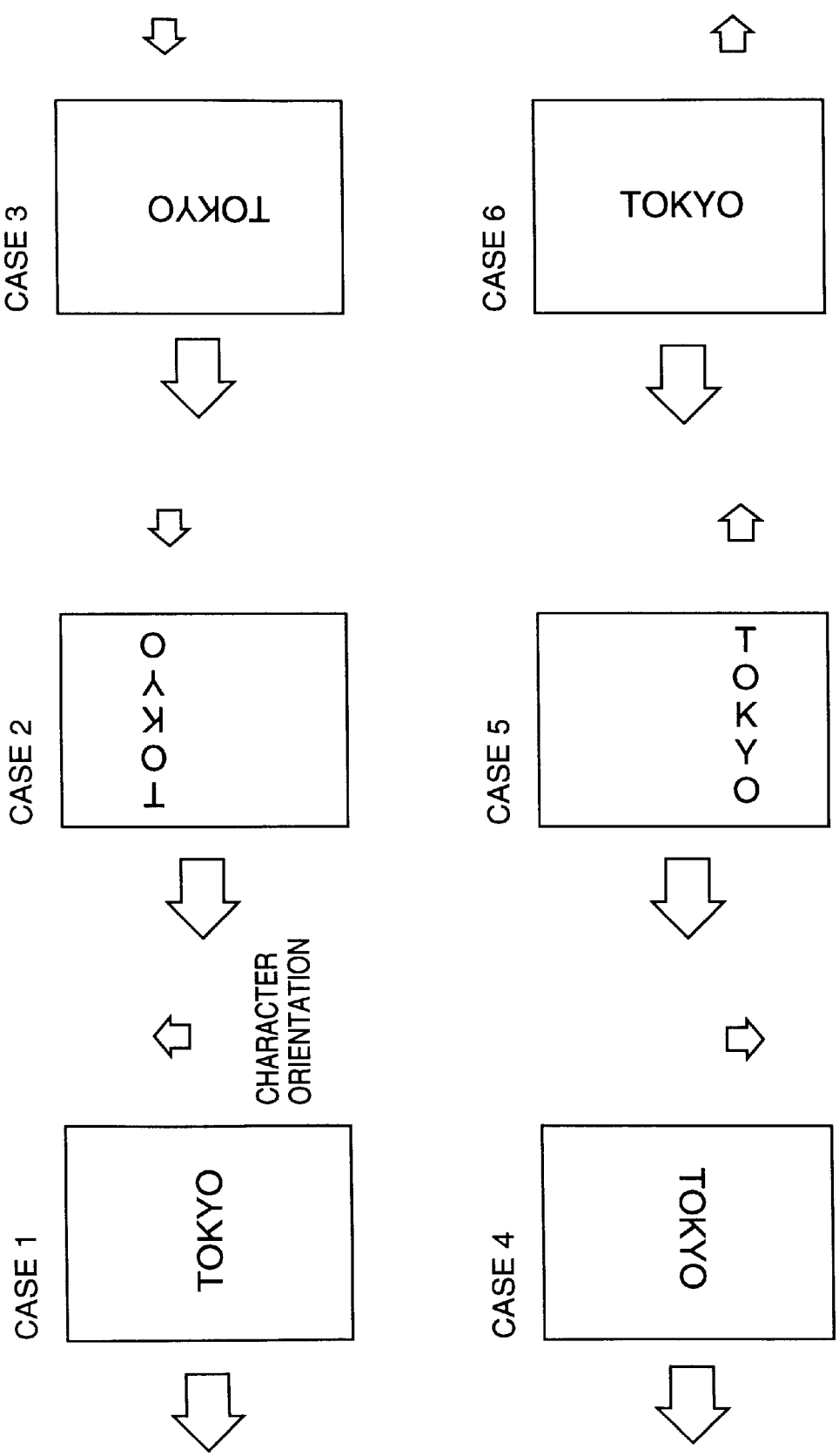
FIG. 8 is a diagram showing the orientation of originals and the orientation of characters on the originals.

FIG. 8 is a diagram of various patterns representing an original set in the automatic supply device 101. An original placed in the automatic supply device 101 can assume a total of six patterns indicated at cases 1~6 in FIG. 8. The large arrows in FIG. 8 indicate the direction in which the original is conveyed and the small arrows indicate the orientation of the characters. When these six patterns are analyzed, it will be understood, with regard to the image of case 4, for example, that the image of case 1 has been rotated by exactly 180°. Here it is judged that the character orientation of the original in case 1 is up and the character orientation of the original in case 4 is down. This judgment of character orientation is rendered based upon the results of processing executed in accordance with the flowchart of FIG. 5.

Accordingly, if results of recognition of the kind shown at case 4 are obtained when character orientation is subjected to recognition processing, the image is rotated by 180°, whereby images of originals of the same type can all be made to agree with the orientation of case 1, as in the manner of case 1 and case 4. Since the image of case 5 is the result of rotating the image of case 2 by 180° and the image of case 6 is the result of rotating the image of case 3 by 180°, rotating the images of cases 5 and 6 based upon the results of character recognition make it possible to standardize the images of cases 2, 5 to the orientation of case 2 and to standardize the images of cases 3, 6 to the orientation of case 3. Here the character orientation is left with regard to the originals of cases 2, 3 and right with regard to the originals of cases 5, 6.

Figure 9:
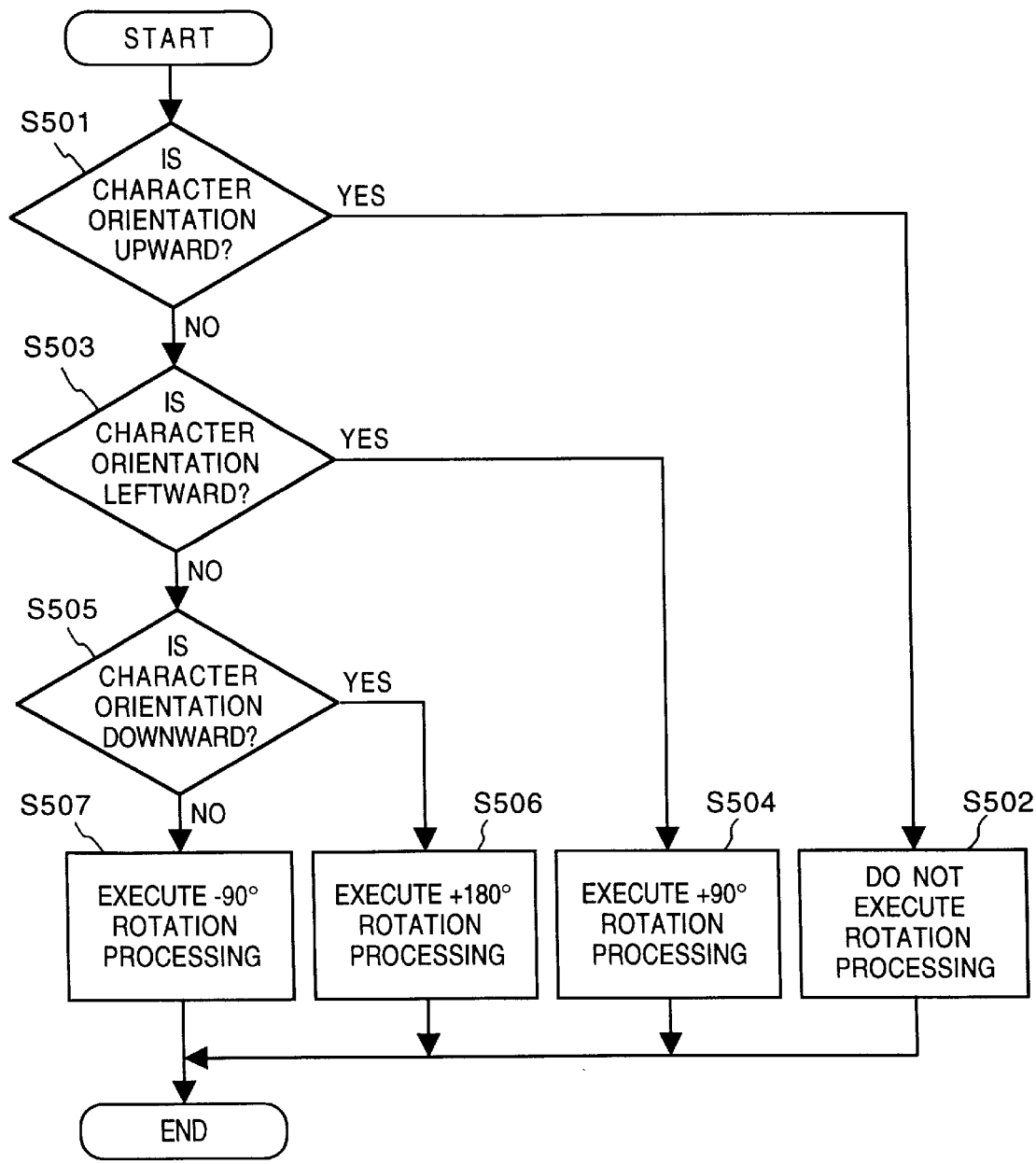
FIG. 9 is a flowchart of processing for determining orientation processing.
Figure 10:
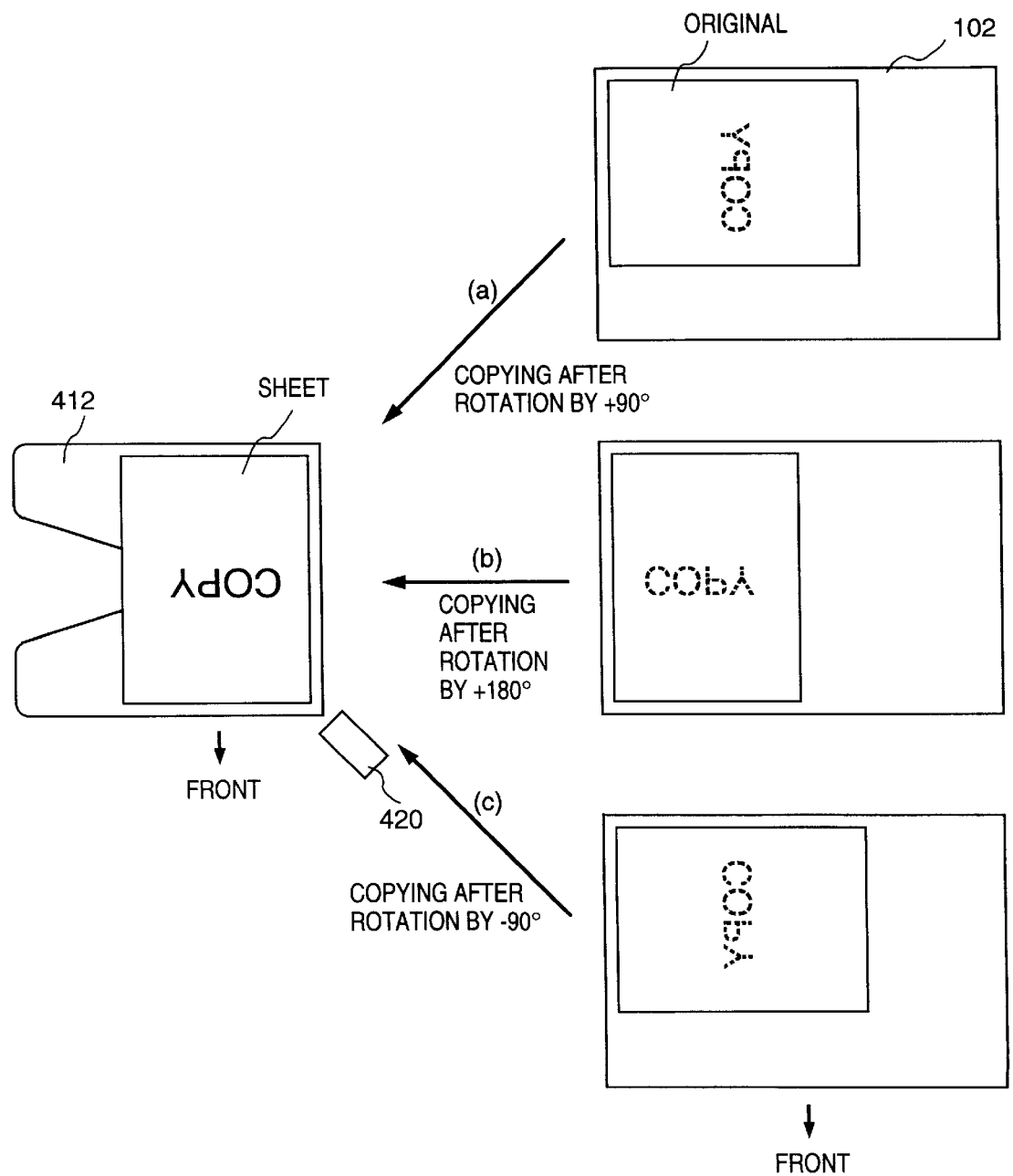
FIG. 10 is a diagram showing the relationship between the orientation of a set original and the position at which a copy is stapled.

Next, reference is made to the control flowchart of the image editor 309, which is shown in FIG. 9, to describe control of processing for rotating the image of an original so that stapling is always performed at the left corner regardless of the orientation of the original set on the glass platen 102 or automatic original conveyance device. In a case where the character recognition unit 308 recognizes that a character in an image stored in the image memory 307 has an upward orientation ("YES" at step S501), the image editor 309 delivers the image data, which has been read out of the image memory 307, to the image recording unit 120 without subjecting this stored image to rotation processing. The recording unit 120 prints out the image on a sheet as is (step S502). The sheet on which printing has been performed via steps S501, S502 is stapled, as shown in FIG. 3, by the stapler 420 of the sorter 400. If the character in the image stored in the image memory 307 is recognized to have the leftward orientation ("YES" at step S503), then the image stored in the image memory 307 is rotated by +90° before being outputted to the image recording unit 120 (step S504). The image editor 309 stores the image temporarily and rotates the image by address control. The sheet on which printing is performed via steps S503, S504 is stapled as shown in FIG. 10(a). When the character has the downward orientation and the rightward orientation, rotation processing is by +180° (step S506) and −90° (step S507), respectively, and stapling is performed in the manner shown in FIGS. 10(b) and 10(c), respectively.

In the foregoing embodiment, the method set forth above is described as one example of a means for recognizing character orientation. However, as long as a character is recognizable, any method of achieving this is acceptable and it is not necessary that the above-described method be adopted.

In accordance with the first embodiment, the orientations of originals to be copied are automatically subjected to character recognition by an optical character recognition device with which the copier apparatus comes equipped, and the orientations of all images of the original are made to automatically conform to the character orientation before copying is performed. As a result, prior to copying the operator need not take the trouble to confirm the character orientation of an original which is set in the automatic supply device. This makes it possible to eliminate extra work. The invention is particularly useful when it is desired to make copies stapled at the same stapling position.

(Second Embodiment)

In a case where an original is oriented so as to be up-side down, the first embodiment is such that the image of the original is rotated by 180° to standardize its orientation. In a case where originals are introduced in mixed fashion, namely with some being faced up and the others being faced down, the second embodiment of the invention is such that the orientation of the originals is standardized in the same manner as set forth above. The construction of the apparatus is the same as that of the first embodiment and need not be described again.

Figure 11:
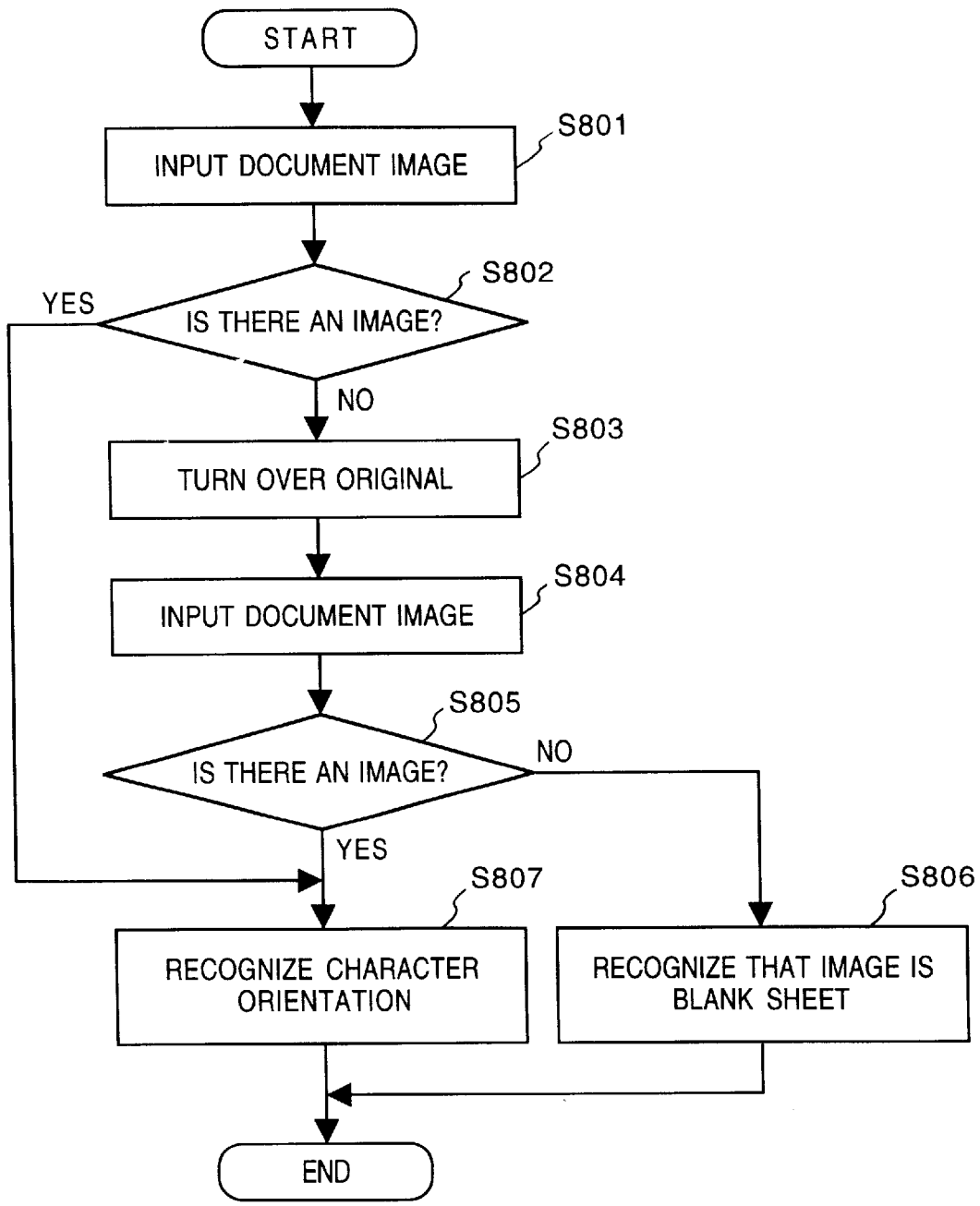
FIG. 11 is a flowchart of control for rotating an original.

A method of recognizing characters on an original according to the second embodiment is described below with reference to the flowchart shown in FIG. 11.

First, at step S801, the image of the original is read by the reading unit and the image data is stored in the image memory 307. Next, at step S802, it is determined whether an image exists. If the original has been face down, the original image is a blank sheet of paper and therefore the only image data stored is data indicative of the blank sheet. Accordingly, if the image data is judged to be that indicative of blank paper, the program proceeds to step S803, where the original that has been read in by the CPU 311 is turned over by the supply device 101. The image is read in again and stored in the image memory 307 at step S804. Next, it is determined again at step S805 whether the image is that of a blank sheet of paper. If it is again determined that the image data is indicative of a blank sheet of paper (e.g., if both sides of the original have no image data, as in the manner of an insertion sheet), the program proceeds to step S806, at which the image of the blank sheet is outputted as is. In a case where image data can be recognized, the program proceeds to step S807, at which this image is adopted as the image of the top side. Processing similar to that of steps S402~S409 shown in FIG. 5 is then executed, the character orientation of the original image is recognized and copying is performed while standardizing image orientation.

In accordance with the second embodiment, copying is performed upon standardizing orientation and facing direction even when originals are loaded in mixed form, i.e., with some face down and some face up. As a result, the operator need not take the trouble to confirm the front or back side of an original or the character orientation of the original. This makes it possible to eliminate extra work to an even greater extent (Third Embodiment)

When a book is to be copied, the light from the illuminating lamps does not sufficiently reach the binding portion of the book. Consequently, a black line referred to as a book frame is produced on the paper after copying. The third embodiment automatically recognizes this portion as a black frame using the character recognition function and removes this portion.

FIG. 12 is a flowchart showing processing for removing a book frame according to the third embodiment.

At step S901 in FIG. 12, an image of a book to be copied is entered from the image reading unit, a character is cut from the image at step S902 and histograms in the vertical and horizontal directions are created with regard to each character at step S903. Next, a binary graph is created from the results of the histograms at step S904. Here the portion of the book frame is not in a state in which the image overlaps in the form of a black stripe. Therefore, when binarization is performed, the central portion of the image (in the horizontal or vertical direction) has a value of "1". Based upon this result, the book frame portion is recognized at step S905. The book frame recognized is erased automatically at step S906.

In accordance with the third embodiment, the black line referred to as a book frame is automatically recognized as a black frame using the character recognition function and this portion is eliminated.

The present invention can be applied to a system constituted by a plurality of devices or to an apparatus comprising a single device. Furthermore, it goes without saying that the invention is also applicable to a case where the object of the invention is attained by supplying a program to a system or apparatus.

As many apparently widely different embodiments of the present invention can be made without departing from the spirit and scope thereof, it is to be understood that the invention is not limited to the specific embodiments thereof except as defined in the appended claims.

What is claimed is:

1. A copier apparatus comprising:
    reading means for reading each character in an image from an original:
    determining means for determining a sum of a horizontal width and a vertical width of each character in the read image;
    extracting means for extracting a character in the read image, and for selecting a character for which the determined sum is large;
    character recognizing means for recognizing the selected character from various directions;
    discriminating means for discriminating orientation of the image in accordance with the recognized selected character by said character recognizing means;
    processing means for subjecting the image read by said reading means to rotation processing in conformity with results of discrimination performed by said discriminating means; and
    recording means for recording an image, which is obtain from said processing means, on a sheet.

2. The apparatus according to claim 1, further comprising binding means for applying binding processing to the sheet on which the image has been recorded by said recording means.

3. The apparatus according to claim 2, wherein said binding means is a stapler.

4. The apparatus according to claim 3, wherein said stapler is provided at a predetermined position, and said processing means executes the rotation processing in such a manner that an upper left corner of the image on the sheet is stapled at all times.

5. The apparatus according to claim 1, wherein said processing means executes rotation processing to rotate the image by any of 0°, 90°, 180° and −90°.

6. The apparatus according to claim 1, further comprising histogram creating means for creating histograms of dots in vertical and horizontal directions with regard to the read image, wherein said extracting means extracts a large character based on the histograms in the vertical and horizontal directions.

7. The apparatus according to claim 1, further comprising:
    histogram creating means for creating histograms of dots in vertical and horizontal directions with regard to the read image, and removing means for removing a shade in the reading process based on the histograms created by said histogram creating means.

8. A copying method comprising:

reading step of reading each character in an image from an original;

a determining step of determining a sum of a horizontal width and a vertical width of each character in the read image;

an extracting step of extracting a character in the read image, and for selecting a character for which the determined sum is large;

a character recognizing step of recognizing the selected character from various directions;

a discriminating step of discriminating orientation of the image in accordance with the recognized selected character at said character recognizing step;

a processing step of subjecting the image read at said reading step to rotation processing in conformity with results of discrimination performed at said discriminating step; and a recording step of recording an image, which is obtained at said processing step, on a sheet.

9. The method according to claim 8, further comprising a binding step of applying binding processing to the sheet on which the image has been recorded at said recording step.

10. The method according to claim 9, wherein said binding step is stapling using a stapler.

11. The method according to claim 10, wherein said stapler is provided at a predetermined position, and said processing step executes the rotation processing in such a manner that an upper left corner of the image on the sheet is stapled at all times by said stapler.

12. The method according to claim 8, wherein said processing step executes rotation processing to rotate the image by any of 0°, 90°, 180° and −90°.

13. The method according to claim 8, further comprising a histogram creating step of creating histograms of dots in vertical and horizontal directions with regard to the read image, wherein said extracting step extracts a large character based on the histograms in the vertical and horizontal directions.

14. The method according to claim 8, further comprising:

a histogram creating step of creating histograms of dots in vertical and horizontal directions with regard to the read image, and a removing step of removing a shade in the reading process based on the histograms created in said histogram creating step.

15. An image processing apparatus comprising:

input means for inputting an original image having a plurality of characters;

determining means for determining a sum of a horizontal width and a vertical width for each character in the original image;

character recognizing means for recognizing the selected character;

discriminating means for discriminating orientation of the original image in accordance with the recognized selected character by said character recognizing means; and processing means for subjecting the original image read by said reading means to rotation processing in conformity with results of discrimination performed by said discriminating means.

16. An image processing method comprising;

an input step of inputting an image from an original image;

a determining step of determining a sum of a horizontal width and a vertical width of each character in the original image;

an extracting step of extracting a character in the original image, and for selecting a character for which the determined sum is large;

a character recognizing step of recognizing the selected character;

a discriminating step of discriminating orientation of the original image in accordance with the recognized selected character at said character recognizing step; and a processing step of subjecting the original image input at said input step to rotation processing in conformity with results of discriminating performed at said discriminating step.

17. An image processing method comprising:

an input step of inputting an image from an original image;

a determining step of determining at least one of a horizontal width and a vertical width of each character in the original image;

an extracting step of extracting a character in the original image, and for selecting a character for which the determined width is large;

a character recognizing step of recognizing the selected character;

a discriminating step of discriminating orientation of the original image in accordance with the recognized selected character at said character recognizing step; and a processing step of subjecting the original image input at said input step to rotation processing in conformity with results of discrimination performed at said discriminating step.

18. An image processing apparatus comprising:

input means for inputting an original image having a plurality of characters;

determining means for determining at least one of a horizontal width and a vertical width for each character in the original image;

extracting means for extracting a character in the original image, and for selecting a character for which the determined width is large;

character recognizing means for recognizing the selected character;

discriminating means for discriminating orientation of the original image in accordance with the recognized selected character by said character recognizing means; and processing means for subjecting the original image input by said input means to rotation processing in conformity with results of discrimination performed by said discriminating means.

19. An image processing apparatus comprising:

input means for inputting an original image having a plurality of characters;

determining means for determining both of a horizontal width and a vertical width for each character in the original image;

extracting means for extracting a character in the original image, and for selecting a character for which the determined widths is large;

character recognizing means for recognizing the selected character;

discriminating means for discriminating orientation of the original image in accordance with the recognized selected character by said character recognizing means; and processing means for subjecting the original image input by said input means to rotation processing in conformity with results of discrimination performed by said discriminating means.

20. An image processing method comprising:

an input step of inputting an image from an original image;

a determining step of determining both of a horizontal width and a vertical width of each character in the original image;

an extracting step of extracting a character in the original image, and for selecting a character for which the determined widths is large;

a character recognizing step of recognizing the selected character;

a discriminating step of discriminating orientation of the original image in accordance with the recognized selected character at said character recognizing step; and a processing step of subjecting the original input at said input step to rotation processing in conformity with results of discrimination performed at said discriminating step.

* * * * *

UNITED STATES PATENT AND TRADEMARK OFFICE
CERTIFICATE OF CORRECTION

PATENT NO. : 5,930,001
DATED : July 27, 1999
INVENTOR(S) : AKIHIKO SATOH ET AL.

It is certified that error appears in the above-identified patent and that said Letters Patent is hereby corrected as shown below:

ON TITLE PAGE, [56] FOREIGN PATENT DOCUMENTS

"2264560    9/1990 United Kingdom" should read
--2264560    9/1993 United Kingdom--.

COLUMN 7

Line 49, "extent" should read --extent.--.

COLUMN 8

Line 42, "obtain" should read --obtained--.

COLUMN 10

Line 1, "comprising;" should read --comprising:--.

Signed and Sealed this

First Day of August, 2000

Attest:

Q. TODD DICKINSON

*Attesting Officer*           *Director of Patents and Trademarks*